(12) United States Patent
Lee

(10) Patent No.: US 10,310,281 B1
(45) Date of Patent: Jun. 4, 2019

(54) OPTICAL PROJECTOR WITH OFF-AXIS DIFFRACTIVE ELEMENT

(71) Applicant: K Laser Technology, Inc., Hsinchu (TW)

(72) Inventor: Wai-Hon Lee, Los Altos, CA (US)

(73) Assignee: K Laser Technology, Inc., Hsinchu (TW)

( * ) Notice: Subject to any disclaimer, the term of this patent is extended or adjusted under 35 U.S.C. 154(b) by 0 days.

(21) Appl. No.: 15/832,682

(22) Filed: Dec. 5, 2017

(51) Int. Cl.
*G06K 9/00* (2006.01)
*G02B 27/18* (2006.01)
*G02B 27/22* (2018.01)
*G02B 27/42* (2006.01)

(52) U.S. Cl.
CPC ............ *G02B 27/18* (2013.01); *G02B 27/22* (2013.01); *G02B 27/4255* (2013.01); *G06K 9/00228* (2013.01)

(58) Field of Classification Search
CPC ............ G02B 27/0037; G02B 27/0043; G02B 27/0944; G02B 27/1086; G02B 27/1093; G02B 27/60; G06T 7/521
See application file for complete search history.

(56) References Cited

U.S. PATENT DOCUMENTS

| 6,188,062 B1 | 2/2001 | Lee |
| 7,699,516 B1 | 4/2010 | Lee |
| 2008/0240502 A1 | 10/2008 | Freedman et al. |
| 2009/0185274 A1 | 7/2009 | Shpunt |
| 2010/0007717 A1 | 1/2010 | Spektor et al. |
| 2011/0075259 A1 | 3/2011 | Shpunt |
| 2013/0038881 A1 | 2/2013 | Pesach et al. |
| 2013/0170004 A1* | 7/2013 | Futterer .............. G02B 6/0046 359/9 |
| 2014/0307307 A1* | 10/2014 | Georgiou ................ H04N 5/33 359/355 |
| 2014/0376092 A1* | 12/2014 | Mor ................... G01B 11/2513 359/569 |
| 2015/0253123 A1 | 9/2015 | Braker et al. |
| 2016/0025993 A1 | 1/2016 | Mor et al. |
| 2016/0223724 A1* | 8/2016 | Hudman ........... G01B 11/2513 |
| 2016/0265906 A1 | 9/2016 | Yamashita et al. |
| 2016/0309135 A1* | 10/2016 | Ovsiannikov ...... H04N 5/23245 |
| 2017/0287151 A1 | 10/2017 | Han et al. |

FOREIGN PATENT DOCUMENTS

| WO | 2007043036 A1 | 4/2007 |
| WO | 2007105205 A2 | 9/2007 |
| WO | 2008120217 A2 | 10/2008 |

OTHER PUBLICATIONS

Wai-Hon Lee, "Computer-Generated Holograms: Techniques and Applications," 1978, pp. 121-232, vol. XVI, Progress In Optics, edited by E.Wolf, North-Holland Publishing Company, Amsterdam New York Oxford.

(Continued)

*Primary Examiner* — Kimberly N. Kakalec
(74) *Attorney, Agent, or Firm* — Kilpatrick Townsend & Stockton LLP

(57) ABSTRACT

Apparatus for projecting a pattern includes a laser source, a collimating lens and a diffractive optical element (DOE) to diffract the collimated laser beam into a specific dot pattern for sensing the depth of a three dimensional (3D) surface.

17 Claims, 8 Drawing Sheets

(56) References Cited

OTHER PUBLICATIONS

"Apple VSCEL supplier suggests TrueDepth coming to multiple iPhones this fall." Retrieved on Jun. 28, 2018. Retrieved from the Internet: https://appleinsider.com/articles/18/03/08/apple-vcsel-supplier-suggests-truedepth-coming-to-multiple-iphones-this-fall_ 11 pages.

"Lumentum Has Leg Up on Finisar in First iPhone X Units, Say Piper, Raymond James." Retrieved on Jun. 28, 2018. Retrieved from the Internet: https://www.barrons.com/articles/lumentum-has-leg-up-on-finisar-in-first-iphone-x-units-say-piper-raymond-james-1505328034_3 pages.

Wai-Hon Lee, "High Efficiency Multiple Beams Gratings," Applied Optics, Jul. 1,1979, pp. 2152-2158, vol. 18, Optical Society of America.

Spagnolo, "Diffractive optical element-based profilometer for surface inspection," 2001, Opt. Eng. 40(1), pp. 44-52 (Year: 2001).

\* cited by examiner

OPTICAL PROJECTOR WITH OFF-AXIS DIFFRACTIVE ELEMENT

BACKGROUND OF THE INVENTION

The present invention relates to optical projection using diffraction for uses such as three dimensional (3D) surface measurements for facial recognition or other purposes.

Optical projection of a pattern is used in applications such as 3D surface measurements. The positions of a pattern of dots caused by beams projected onto a flat surface can be determined. When the same pattern of dots is projected on a 3D surface to be measured, the positions of the dots will deviate from their designed positions as a result of the different intersection height on the 3D surface. These deviations can be measured and correlated to the different distances, or depth, of the 3D surface, and a 3D image can be generated.

One configuration uses a laser beam which is divided into multiple beams to generate the pattern of dots on the 3D surface, which are reflected back to a detector. FIG. 1 shows an example of a pattern of beams/dots, such as beam 101, projected onto a face 102. When a Diffractive Optical Element (DOE) is used to divide the incoming beam into N beams according the pattern design, the power of each diffracted beam (e.g., $1^{st}$ order beam 101) is roughly equal to $\eta P/N$ where $\eta$ is the diffraction efficiency and P is the incoming laser power. In most cases, the diffraction efficiency cannot reach 100 percent. The remaining power $(1-\eta)P$ will remain in the un-diffracted beam ($0^{th}$ diffracted order), shown as beam 100, and scattering noise. The ratio of the power between the un-diffracted beam ($0^{th}$ diffracted order) to one of the diffracted order is equal to $(1-\eta)N/\eta$. For large N such as 1000 or more, even with 98% efficiency, each diffracted beam will have 0.098% of the incoming laser power and the $0^{th}$ order has 2% of the incoming laser power. That means the $0^{th}$ order has more than 20 times more laser power than the other diffracted orders. In order to detect the diffracted dot (101), a remote sensor may require the diffracted dot to have certain amount of laser power.

When used for facial detection, the laser power must be limited to avoid damaging the person's eyes. Even with non-visible IR lasers, too high a power of the laser can result in burning the retina. Because the $0^{th}$ order 100 is 20 times higher, the laser power at the $0^{th}$ order may exceed the minimum power for the safety of the eye.

US Published Patent Application No. 2011/0075259 described a technique to reduce the ratio of $0^{th}$ order power to the diffracted order power by sub-dividing the DOE into M DOEs. Each sub DOE will have N/M dots. Now for each diffractive order in a sub DOE, the laser power of each diffractive beam is $\eta P1M/N$. P1 is the laser power striking on each sub DOE. Under the best circumstances P1 for each sub DOE is equal to P/M. As a result the laser power of each diffracted beam is unchanged and equal to $\eta P/N$. On the other hand the of $0^{th}$ order power of each sub DOE is only $(1-\eta)P/M$. The ratio of the power between the un-diffracted beam ($0^{th}$ diffracted order) to one of the diffracted order is now equal to $(1-\eta)N/M\eta$. Let's continue with the previous example and assume M is equal to 9. The $0^{th}$ order beam to the diffracted beam ratio becomes 2.26. As a result, there is significantly less chance for $0^{th}$ order to exceed the eye safety limit of laser power.

BRIEF SUMMARY OF THE INVENTION

In an embodiment of the present invention, an off-axis DOE is provided. An off-axis DOE has the 0 order beam off-axis, to one side, rather than being in the middle of the pattern. The 0 order beam is then eliminated, such as by blocking it somewhere along the optical path, or otherwise not projecting it onto the 3D surface, such as a person's face. Thus, the power of the 0 order beam does not need to be limited, since it is no longer a danger to a person's eyes.

In one embodiment, a laser element produces a laser beam which is collimated by a collimating lens. The collimated beam then passes through an off-axis DOE and is reflected off a reflective element (e.g., mirror) onto the person's face or other 3D surface. The 0 order beam is blocked after reflecting off the mirror by a blocking element, which is ideally non-reflective or diffusely reflective to avoid interfering reflected beams off the blocking element. In one embodiment, the block element is created by limiting the size of the opening in a housing for the optical elements, so that the majority of the pattern escapes through the opening, but the 0 order beam does not escape.

In one embodiment, an edge emitting laser chip is used to optimize the manufacturing process. This also allows compact placement of a reflective element on the surface of a substrate, allowing the 0 order beam to diverge enough to be more easily blocked before reflecting the beam onto the person's face or other 3D surface.

In the mass production of DOEs there are many factors which can affect the efficiency of the DOE. Such factors include thickness control of the DOE surface, refractive index of the polymer used in reproducing the DOE and or the shrinkage of the polymer after production. With the off-axis approach, since the $0^{th}$ order is block within the optical projector and will not present any danger to the eyes, there is no need to worry about the effect of different production techniques on the brightness of the $0^{th}$ order beam. The production can either be done more inexpensively, or the best production techniques can be used to increase the diffraction efficiency.

In one embodiment, the off-axis DOE is used in an electronic device, such as a smartphone, to measure the depth features of a person's face or to determine the distance of a person's face from a camera. Calibration is done by recording the calibration positions of a plurality of elements of the off-axis diffraction pattern as reflected off a flat surface and detected by the photodetector. Then, the measured positions of a plurality of elements of the off-axis diffraction pattern as reflected of a non-flat object to be measured, such as a person's face, are recorded. Then, the differences between the calibrated and measured positions are determined. From those differences, the change in depth can be determined. That information is used to generate a map of the depth of the non-flat object at different points and can be used for the recognition of the non-flat object.

DETAILED DESCRIPTION OF THE INVENTION

Figure 1:
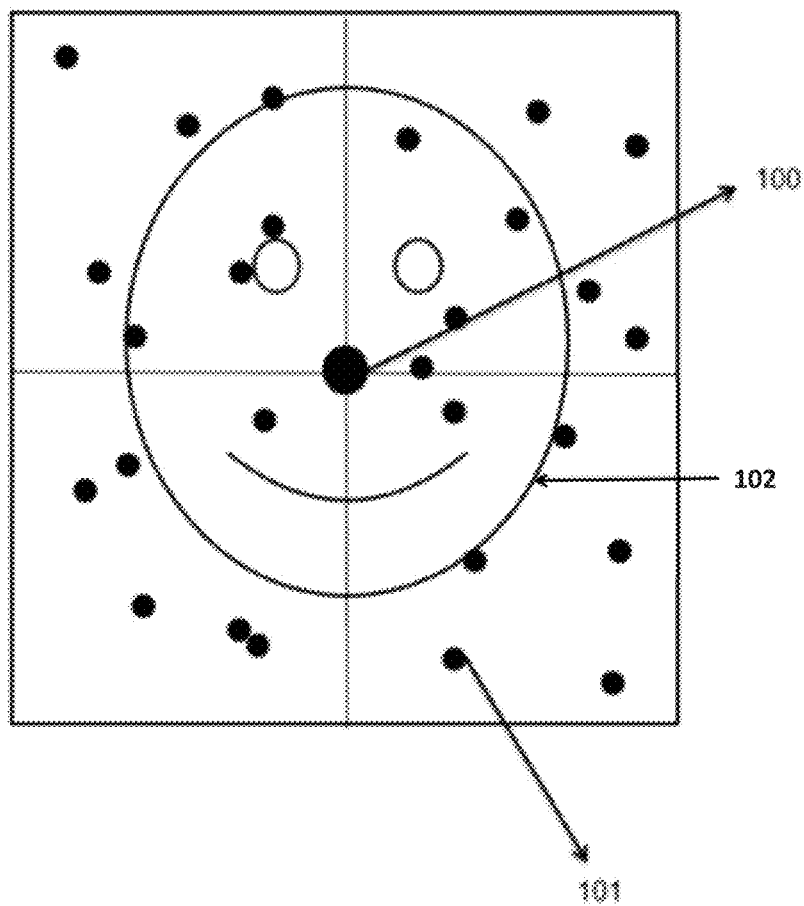
FIG. 1 is an example of a prior art on-axis diffraction pattern.
Figure 2:
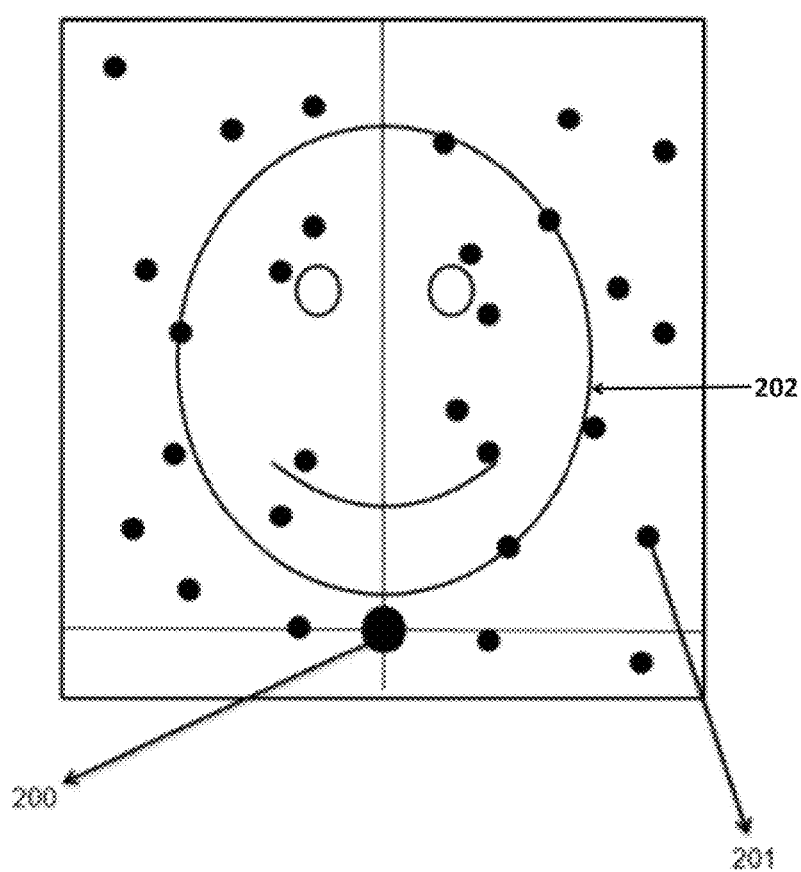
FIG. 2 is an example of an off axis diffraction pattern according to an embodiment.

FIG. 2 is a diagram of an example of a pattern generated by an embodiment of the present invention where the DOE is an off-axis diffractive element. In contrast to the diffraction pattern shown in FIG. 1, the $0^{th}$ order beam 200 is near the bottom of the diffraction pattern. The $0^{th}$ order beam 200 is below the face 202 shown in FIG. 2. Since the $0^{th}$ order is away from the surface measurement area, we can implement a block to this $0^{th}$ order beam somewhere along the optical path. In theory, the $0^{th}$ order beam need not be blocked, since it does not come close to the person's eyes as shown in FIG. 2. However, since the pattern may move around as the user is preparing to use it, or it may be seen by someone standing near the user, it is better to completely avoid a high intensity $0^{th}$ order beam.

The construction of such an off-axis diffraction element is described, for example, in Wai-Hon Lee, Computer-Generated Holograms: Techniques and Applications, reprinted from Progress in Optics, 1978, and Wai-Hon Lee U.S. Pat. No. 7,699,516, the disclosures of which are hereby incorporated herein by reference. In general, an off-axis diffraction pattern is created by a computer generated hologram (CGH). Suppose that the projected dot pattern is represented by a function f(x,y) and F(u,v) is its Fourier transform. The mathematical representation of the CGH is given by $$H(u,v)=|F(u,v)|\{1+\cos(2\pi u/T+\varphi(u,v))\} \quad (1)$$

Where $\varphi(u,v)$ is the phase of the complex function F(u,v) and T is related to the diffraction angle θ by the formula sin θ/λ. A laser recording device is then used to plot the function H(u,v) on photographic film or photoresist. The resulting CGH is the off axis diffraction element which may be used in an embodiment of this invention.

Figure 3:
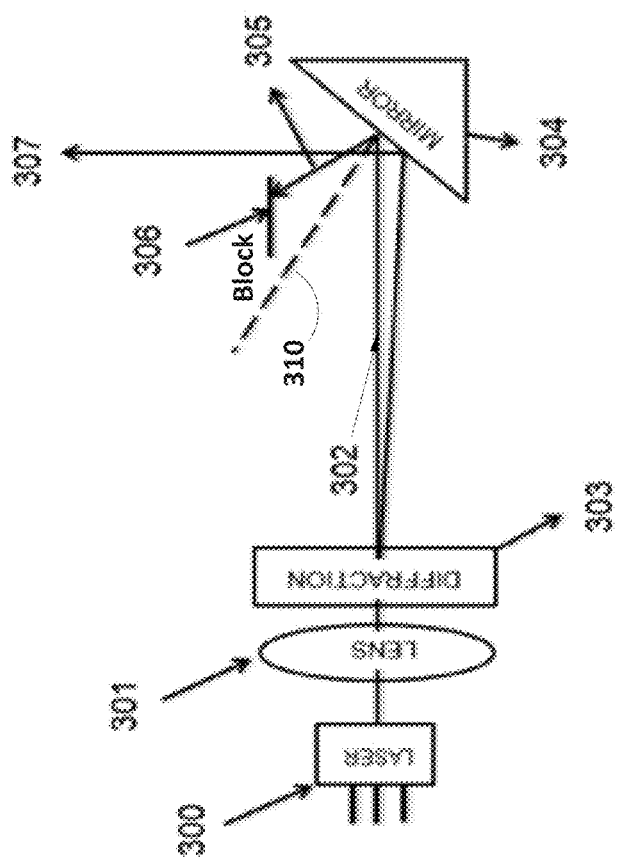
FIG. 3 is a first embodiment of an optical projector using off-axis DOE.

FIG. 3 is a diagram of a first embodiment of the present invention. A laser 300 is shown, which is an edge emitting laser in one embodiment. The diverging beam from the laser 300 is collimated by a collimating lens 301 to produce a collimated beam. The collimated laser beam is then transmitted through an off-axis DOE 303 to produce a group of diffracted beams 302. The beams 302 diffracted by DOE 303 are incident on mirror 304. As shown, beam 305 is the 0th order beam which is the continuation of the laser beams 302. Beam 305 is stopped by a block 306. Arrow 307 represents all the non-0 order off axis beams emerging from the optical projector toward a person's face or other 3D object. The dotted line 310 is the normal to the mirror surface. The center of the diffracted bundles is normal to beam 302.

Block 306 preferably has a low reflective, light diffusing surface such that any reflected portion of the $0^{th}$ order beam is at least less bright than a second order diffraction beam. Ideally, any light from the $0^{th}$ order beam is either uniformly dispersed, or is significantly less than the brightness of any higher order beam in the off-axis diffraction pattern. In this way, any reflection of the $0^{th}$ order beam will not be picked up by mirror 304 and impact the measurement of the pattern.

Figure 4:
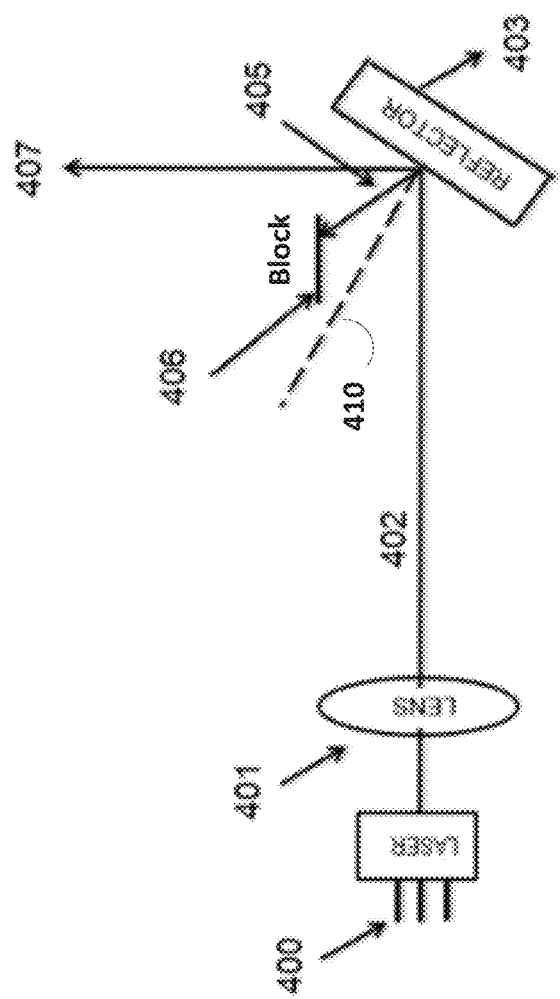
FIG. 4 is a second embodiment of an optical projector using off axis DOE.

FIG. 4 shows a second embodiment of this current invention. In this embodiment the off axis DOE 403 is a reflective element—the diffractive element and the mirror are combined. Again the 0th order beam 405 is blocked by a block or stop 406. Arrow 407 represents all the off axis beams emerging from the optical projector. An advantage of this embodiment is the need for fewer parts, since the DOE and reflective element are combined. However, this results in the $0^{th}$ order beam not having as much separation from the other beams in the pattern by the time it hits block 406. This can present a manufacturing challenge for obtaining the needed precise placement. Alternately, the diffraction pattern can be varied to create quicker divergence of beams, or the block can be placed further from the combined DOE/reflector 403. The dotted line 410 is the normal to the mirror surface. The center of the diffracted bundles is normal to beam 402.

Figure 5:
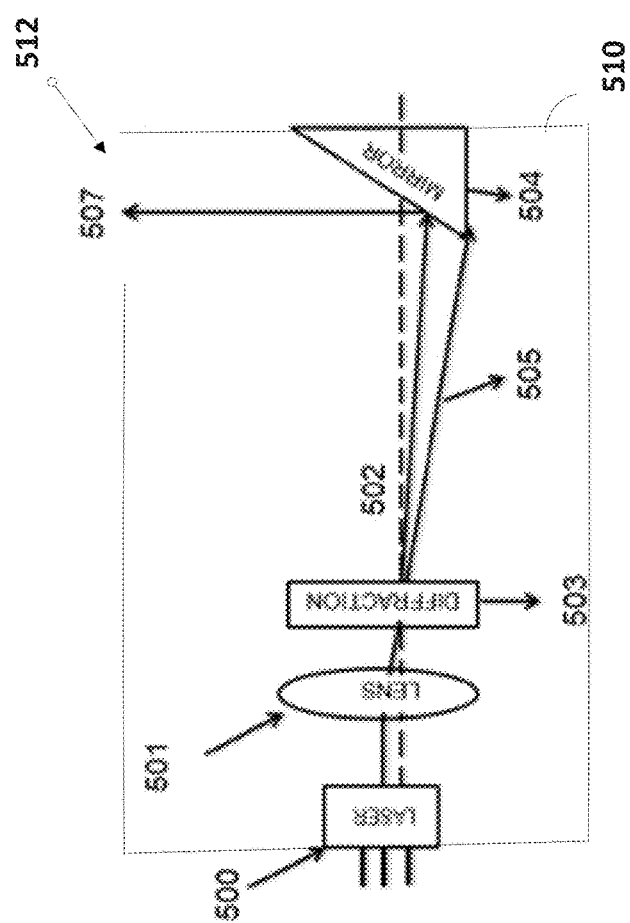
FIG. 5 is a third embodiment of an optical projector using off axis DOE.

FIG. 5 shows a third embodiment of this current invention. The optical axis of laser 500 is not along the optical axis 502 of the lens 501. This is a different way to produce an off-axis diffraction pattern, rather than having the laser axis along the lens axis, and using the diffraction pattern to diffract the $0^{th}$ order beam to an off-axis position. As a result, the collimated beam 505 is incident on the DOE at an angle. The diffracted beam 507 from the DOE is then reflected by mirror 504 and exits the projection unit housing 510 through an opening 512. The 0th order beam 505 as shown does not need to be blocked because it is sufficiently off-axis to not be reflected by the mirror 504. The $0^{th}$ order beam will then go past mirror 504, and impact the inside of a housing 510. By coating or otherwise manufacturing the inside of housing 510 to have a low reflectivity, light diffusing surface, reflections of the $0^{th}$ order beam will not interfere with the diffraction pattern. In one embodiment, the angle of the mirror is not 45 degree and is determined by the incident angle of the laser beam and the diffraction angle of the off axis device.

In an alternate embodiment, a surface emitting laser can be used to replace the edge emitting lasers in the previous embodiments. In one embodiment, the laser is a vertical cavity surface emitting laser (VCSEL).

Figure 6:
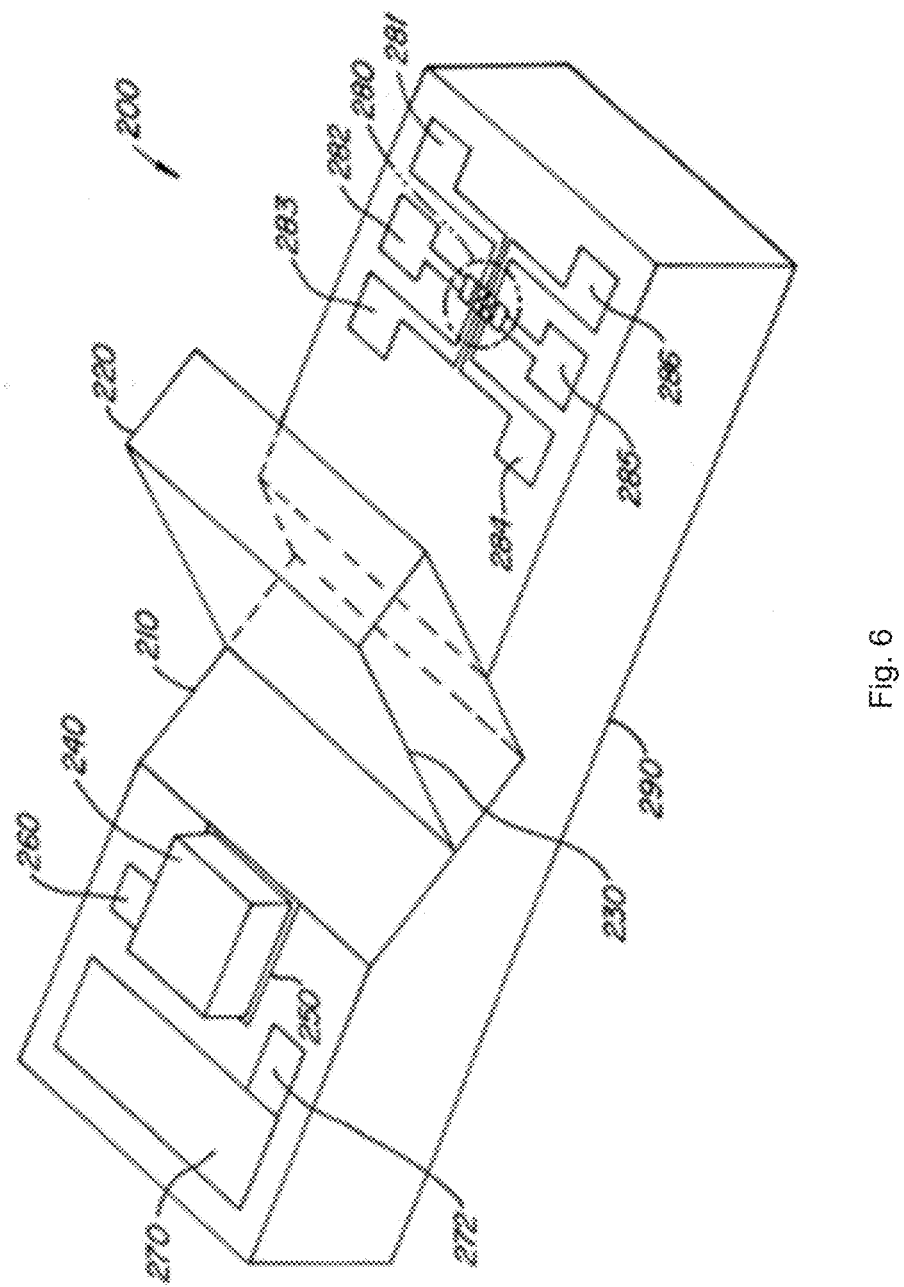
FIG. 6 shows an embodiment of a hybrid laser and photo detector module which can be used in one embodiment of the invention.

FIG. 6 shows an embodiment of a hybrid laser and photo detector module which can be adapted to be used in one embodiment of the invention, as shown in more detail in Wai-Hon Lee U.S. Pat. No. 6,188,062, the disclosure of which is hereby incorporated herein by reference. A photo detector device 200 is shown to have a V-shaped groove 210 etched on its surface. The photo detector is fabricated on a special silicon wafer which has a crystal plane subtending a 45 degree angle with respect to the surface of the wafer as shown in FIG. 2. A mirror 220 is attached to that 45 degree surface by means of adhesive or metallic bonding material such as thin solder. A corrugated structure with period T has been etched on top surface 230 of the mirror 220.

The corrugated structure is designed to split the laser beam into the diffraction pattern. Laser chip 240 is attached to pad 250 on the photo detector by means of electrically conductive adhesive. A bonding pad 260 allows electrical connection be made to the bottom of the laser chip 240. A light sensitive area 270 behind the laser chip 240 is to detect the back light emission from the laser chip and thus serves as a laser power monitor. Pad 272 is for connecting to the anode of the detector element 270. On the back side of the mirror 220 is a set of photo detectors 280 which has six elements, a,b,c,d,e, and f in this embodiment. Additional detector elements can be implemented for multichannel readouts. Pads 281,282,283,284,285,286 are respectively for the anodes of the detectors a,b,c,d,e, and f. The back surface of the detector 290 provide the contact to the cathode of all the light sensitive elements.

Figure 7:
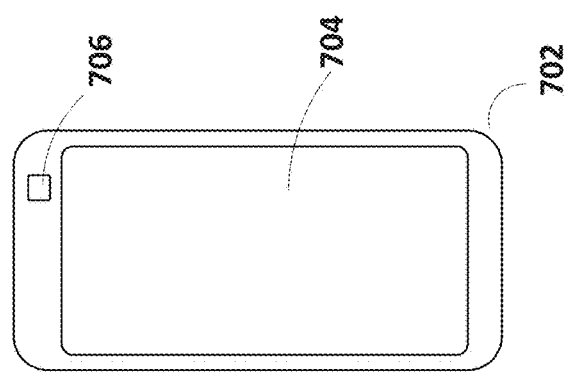
FIG. 7 is a diagram of a smartphone with an integrated optical projector with an off-axis DOE in one embodiment of the invention.

FIG. 7 shows an embodiment of an electronic device 702, such as a smartphone. Device 702 has a display 704 for presenting information to a user, and also functions as a touch screen for inputting information. An optical module 706 is provided, and may include the elements of one of the embodiments of FIGS. 3-6. The photodetector can be part of optical module 706, or can be separately mounted on electronic device 702.

Figure 8:
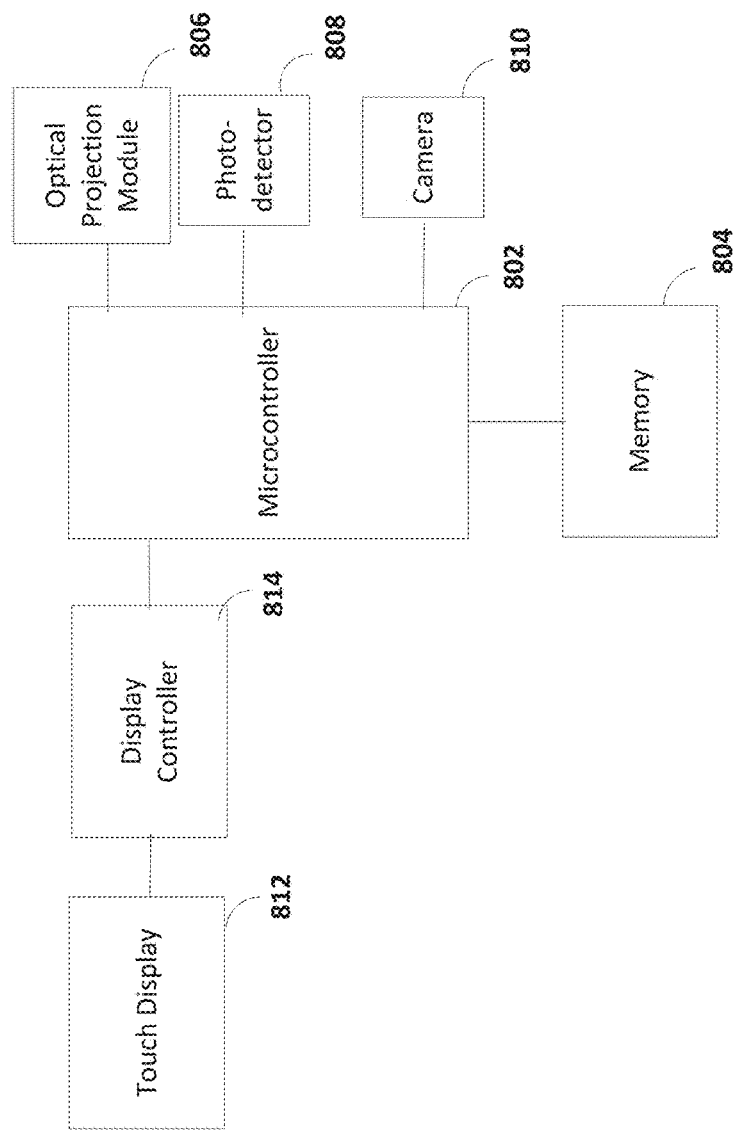
FIG. 8 is a block diagram of the components of a smartphone with an integrated optical projector with an off-axis DOE in one embodiment of the invention.

FIG. 8 is a block diagram of the electronics of an embodiment of an electronic device such as device 702 of FIG. 7. A microcontroller 802, such as a microprocessor, controls the operation of the electronic device. A memory 804 contains the stored program for operating microcontroller 802, along with data storage. Memory 804 can be a flash or other solid state memory in one embodiment, and can be one or multiple memory chips.

A touch display 812 is controlled by a display controller 814, under the direction of microcontroller 802. The touch display provides both user inputs, and provides display information to the user. Optical projection module 806 may be one of the embodiments shown in FIGS. 2-5. A separate photodetector 808 is shown, although it could be integrated into optical projection module 806. A camera 810 is also provided, and other components (not shown) may be included in the electronic device.

In one embodiment, the off-axis DOE is used in an electronic device, such as a smartphone, to measure the depth features of a person's face or to determine the distance of a person's face from a camera. A program in memory 804 controls microcontroller 802 to control camera 810 and optical projection module 806 to provide a composite image of a person's face. Calibration is done by recording the calibration positions of a plurality of elements of the off-axis diffraction pattern as reflected off a flat surface and detected by the photodetector. Then, the measured positions of a plurality of elements of the off-axis diffraction pattern as reflected of a non-flat object to be measured, such as a person's face, are recorded. Then, the differences between the calibrated and measured positions are determined. From those differences, the change in depth can be determined. That information is used to generate a map of the depth of the non-flat object at different points.

In one embodiment, the method for determining depth using the diffraction pattern is set forth in Prime Sense US Published Application No. 20100007717, the disclosure of which is hereby incorporated herein by reference. Additional details of one embodiment are set forth in PCT Publication WO 2007/043036, which describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT Publication WO 2007/105205. The disclosures of PCT Publication WO 2007/043036 and PCT Publication WO 2007/105205 are hereby incorporated herein by reference.

In one embodiment, a program in memory 804 controls microcontroller 802 to combine images from camera 810 with depth information from optical projection module 806 to provide a composite image of a person's face. Facial recognition software can then compare the face to stored faces, either in the device or in the cloud. Such comparison can be used, for example, to authenticate a person as authorized to operate the electronic device or a program on the device. Alternately, it can be used to match a person to a face detected on a social media platform or other platform or application.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. An apparatus comprising:
a laser configured to produce a laser beam;
a collimating lens mounted to intercept the laser beam and produce a collimated beam;
a diffractive optical element (DOE) having an off-axis diffraction pattern and mounted to intercept the collimated beam and produce an off-axis diffracted beam pattern including an off-center 0th order beam; and
a projection element mounted to intercept the off-axis diffracted beam pattern and project a portion of the pattern excluding the 0th order beam;
wherein the projection element comprises:
a reflective component mounted at a non-45 degree angle to the 0th order beam; and
a block mounted to intercept the 0th order beam.

2. The apparatus of claim 1 wherein the block is mounted to intercept the 0th order beam before the reflective component.

3. The apparatus of claim 1 wherein the block is mounted to intercept the 0th order beam after the reflective component.

4. The apparatus of claim 1 wherein the DOE is integrated with the reflective component.

5. The apparatus of claim 1 wherein the projection component comprises a reflective component mounted to reflect a portion of the off-axis diffracted beam pattern but not reflect the 0th order beam.

6. The apparatus of claim 1 wherein the laser is an edge emitting laser.

7. The apparatus of claim 1 wherein the laser is a vertical cavity surface emitting laser (VCSEL).

8. The apparatus of claim 1 wherein the apparatus is mounted in a smartphone.

9. An apparatus comprising:
a laser configured to produce a laser beam;
a collimating lens mounted to intercept the laser beam and produce a collimated beam;
a diffractive optical element (DOE) having an off-axis diffraction pattern and mounted to intercept the collimated beam and produce an off-axis diffracted beam pattern including an off-center 0th order beam; and
a projection element mounted to intercept the off-axis diffracted beam pattern and project a portion of the pattern excluding the 0th order beam;
wherein the projection component includes an aperture positioned to not pass the 0th order beam.

10. An apparatus comprising:
a laser configured to produce a laser beam;
a collimating lens mounted to intercept the laser beam and produce a collimated beam;
a diffractive optical element (DOE) having an off-axis diffraction pattern and mounted to intercept the collimated beam and produce an off-axis diffracted beam pattern including an off-center 0th order beam; and a projection element mounted to intercept the off-axis diffracted beam pattern and project a portion of the pattern excluding the 0th order beam;

wherein the projection element comprises:

a block mounted to intercept the 0th order beam, the block having a low reflective, light diffusing surface such that any reflected portion of the 0th order beam is less bright than a second order diffraction beam.

11. A method comprising:

producing a laser beam;

intercepting the laser beam and producing a collimated beam;

intercepting the collimated beam and producing an off-axis diffracted beam pattern including an off-center 0th order beam; and intercepting the off-axis diffracted beam pattern and projecting a portion of the pattern excluding the 0th order beam wherein the projecting step comprises:

reflecting a portion of the pattern excluding the 0th order beam using a non-45 degree angle to the 0th order beam; and blocking the 0th order beam.

12. The method of claim 11 wherein blocking the 0th order beam is done before reflecting a portion of the pattern excluding the 0th order beam.

13. The method of claim 11 wherein blocking the 0th order beam is done after reflecting a portion of the pattern excluding the 0th order beam.

14. The method of claim 11 wherein both producing an off-axis diffracted beam pattern and reflecting a portion of the pattern excluding the 0th order beam are done using an integrated reflective and diffractive optical element component.

15. The method of claim 11 further comprising:

recording first positions of a plurality of elements of the off-axis diffraction pattern as reflected off a flat surface and detected by the a photodetector;

recording second positions of a plurality of elements of the off-axis diffraction pattern as reflected of a non-flat object to be measured;

determining the difference between the first and second positions for the plurality of elements of the off-axis diffraction pattern as reflected; and generating a map of the depth of the non-flat object at different points based on the difference between the first and second positions for the plurality of elements of the off-axis diffraction pattern as reflected.

16. The method of claim 11 wherein the laser is an edge emitting laser.

17. The method of claim 11 wherein the step of projecting a portion of the pattern excluding the 0th order beam uses a mirror.

* * * * *

UNITED STATES PATENT AND TRADEMARK OFFICE
CERTIFICATE OF CORRECTION

PATENT NO. : 10,310,281 B1
APPLICATION NO. : 15/832682
DATED : June 4, 2019
INVENTOR(S) : Wai-Hon Lee Page 1 of 1

It is certified that error appears in the above-identified patent and that said Letters Patent is hereby corrected as shown below:

In the Claims

Column 8, Line 12, Claim 15, delete "the a" and insert -- the --, therefor.

Signed and Sealed this
Twenty-seventh Day of August, 2019

Andrei Iancu
*Director of the United States Patent and Trademark Office*